United States Patent [19]

Rossé et al.

[11] Patent Number: 4,858,463
[45] Date of Patent: Aug. 22, 1989

[54] PROCESS AND APPARATUS FOR DETECTING LEAKS IN SEALED PACKAGES

[75] Inventors: Meinrad Rossé, la Tour-de-Peilz; Marc-Henri Rossier, Epalinges, both of Switzerland

[73] Assignee: Nestec S. A., Vevey, Switzerland

[21] Appl. No.: 249,239

[22] Filed: Sep. 26, 1988

Related U.S. Application Data

[63] Continuation of Ser. No. 20,541, Mar. 3, 1987, abandoned.

[30] Foreign Application Priority Data

Mar. 22, 1986 [EP] European Pat. Off. ........ 86103958.4

[51] Int. Cl.⁴ ............................................. G01M 3/26
[52] U.S. Cl. ..................................................... 73/49.3
[58] Field of Search .................... 73/49.2, 49.3, 37, 40

[56] References Cited

U.S. PATENT DOCUMENTS

| | | | |
|---|---|---|---|
| 2,467,767 | 4/1949 | Mertler | 73/40 |
| 2,936,611 | 5/1960 | Le Mat et al. | 73/40 |
| 3,331,237 | 7/1967 | Strang | 73/40 |
| 3,504,528 | 4/1970 | Weinberg et al. | 73/49.3 |
| 3,791,197 | 2/1974 | Eukuda | 73/49.3 |
| 3,792,607 | 2/1974 | Fukuda | 73/49.3 |
| 3,978,710 | 9/1976 | Ratajski | 73/49.3 |
| 4,593,554 | 6/1986 | Aarts | 73/49.3 |

FOREIGN PATENT DOCUMENTS

8128651 3/1983 Fed. Rep. of Germany .
81/01333 5/1981 PCT Int'l Appl. .

Primary Examiner—Hezron E. Williams
Attorney, Agent, or Firm—Vogt & O'Donnell

[57] ABSTRACT

The tightness of sealed packages is monitored by means of a process and an apparatus system which utilize and incorporate a first system section, which includes at least one reservoir and a pressure measuring cell, a second system section, which includes a rigid measuring chamber, and means for adjusting pressure of the system sections via the first system section. The first system section is first pressurized to a predetermined pressure, which may be either above or below atmospheric pressure, and then the first and second system sections are brought into communication for establishing a second pressure for the first and second system sections combined. Major leaks in the sealed packages, absence of a sample in the measuring chamber and leaks in the measuring chamber then may be detected with the aid of the pressure measuring cell. For detecting other than major leaks, the first and second system sections then are isolated and a differential pressure cell detects the pressures of the first and second system sections for a timing sufficient to detect differences in pressure between the first and second system sections for detecting if the package being tested has leaks.

8 Claims, 3 Drawing Sheets

PROCESS AND APPARATUS FOR DETECTING LEAKS IN SEALED PACKAGES

CROSS REFERENCE TO RELATED APPLICATION

This is a continuation of co-pending application Serial No. 07/020,541, filed Mar. 3, 1987 now abandoned.

BACKGROUND OF THE INVENTIONS

This invention relates to a process for monitoring the tightness of packs disposed in a measuring chamber. The invention also relates to an arrangement for carrying out this process.

Arrangements for the non-destructive testing of flexible packs for leaks are already known. German Utility Model G 8 128 651 describes one such arrangement comprising a measuring chamber designed to receive the sample to be tested and a feeler in said chamber which is sensitive by contact to variations in pressure and which is connected to a calculator for recording the variations in pressure as a function of time. The disadvantages of an arrangement such as this are that the measuring cells are disposed in the measuring chamber which necessitates careful handling in view of the fragility and sensitivity of the measuring cells. On the other hand, since the feeler is only sensitive by contact, high sensitivity of measurement cannot be expected in view of the risks of unevenness of the sample to be measured. Finally, this known arrangement can only be used for testing flexible packs.

Other arrangements for detecting leaks in rigid objects or packs are also known. The system according to U.S. Pat. No. 2,467,767 comprises a measuring chamber which operates under excess pressure and which is equipped with liquid manometers. The entire system is manually controlled without any automation. All the pressure values have to be acquired by successive observations on the part of the operator who deduces the nature of any leaks therefrom by comparison. The principal limitation of this known process in regard to microleaks is that it is difficult to evaluate the small difference between the values successively read off from the manometer connected to the test chamber, the range of measurement of this manometer being at least equal to the total pressure of the fluid contained in the chamber. As a result, the reliability of the measurements depends upon human parameters, i.e., upon the quality of the observations of the operator. Finally, U.S. Pat. No. 2,467,767 does not make any reference to tests under reduced pressure and is not designed to be used for the detection of leaks in non-rigid objects or packs.

U.S. Pat. No. 3,331,237 describes a system having improved sensitivity through the use of a differential manometer. Unfortunately, this known system is only applicable to solid objects comprising an internal cavity capable of being connected to the measuring equipment by a connecting hose. Accordingly, it cannot be applied either to packs, such as flexible bags, or to rigid packs containing products, connection without destruction of the pack being impossible.

U.S. Pat. No. 3,504,528 describes a system which is also based on differential measurement, the comparison being made between two chambers, namely a measuring chamber and a reference chamber. These two chambers are symmetrically inserted into two circuits connected in parallel from a first chamber initially charged with a gas under pressure. This known system is only applicable to solid objects, such as non-deformable shell cases, and the test can only be carried out under excess pressure. Another disadvantage of this known system lies in the permanent connection of the differential sensor to the two chambers which can lead to overloading of the allegedly very sensitive sensor unless the valves are perfectly synchronized or in the event of a sudden leak in one of the chambers.

Publication Wo 81/01 333 claims an arrangement which is based on the transfer of predetermined quantities of a gas, the differential measurement of the pressure being effected by comparison between two branches which are symmetrical in volume or at least proportional to one another. Intended according to the author for monitoring objects of defined shape comprising a cavity it is desired to test for leaks, this known arrangement is not designed to be applied to flexible bags containing a product, for example, a powder, of which the shape and the volume vary according to the pressure applied and the quantity of gas contained in the bag, these variations being capable of reaching significant proportions without common measurement with those emanating from the manufacturing tolerances of a solid object to the shape of which the measuring chamber is adapted. In addition, this known arrangement has the disadvantage of necessitating the modification of at least two volumes or chambers in the event of a change in the dimensions of the object to be tested.

In addition, the pressures in the system depend upon the feed pressure, for which no regulating or measuring arrangement is provided, so that the detection of a major leak in the described process is rendered uncertain.

SUMMARY OF THE INVENTIONS

The object of the present invention is to provide a measuring process and an arrangement for carrying out this process which enable the disadvantages and limitations of the prior art to be overcome.

Accordingly, the present invention relates to a process for monitoring the tightness of packs disposed in a system comprising a section including means for adjusting the pressure and at least one reservoir and a section including a measuring chamber for the pack to be monitored, in which a predetermined pressure $p_1$ is established in the section including the means for adjusting the pressure, the section under the pressure $p_1$ is placed in communication with the section containing the closed measuring chamber to arrive at a pressure $p_2$, the section which contains the measuring chamber is isolated from the which does not contain the measuring chamber and the differential pressure $\delta p$ between these two sections is measured over a predetermined period by means of a differential pressure cell placed between said measuring chamber and said reservoir. The reservoir serving as pressure reference, although its volume is independent of that of the measuring chamber.

If the pressure $p_2$ is sufficiently close to the pressure $p_1$, in other words if the dead volume in the measuring chamber containing the pack is sufficiently small, the detection and display of leaks are effected at the pressure $p_2$ throughout the system.

By contrast, in cases where $p_1$ is very different from $p_2$, it is preferable to restore the pressure throughout the system to its initial value $p_1$ and then to effect measurement of the leak in the pack in question.

The means for adjusting pressure may operate both under reduced pressure and under excess pressure.

The object of the process according to the invention is the non-destructive testing and measurement of the tightness of flexible, semi-rigid or rigid packs capable of containing products in the form of powders, granules, pastes or liquids, the test preferably being carried out under reduced pressure for flexible packs and generally under excess pressure for rigid packs containing liquid products.

Intended for industrial application, the process according to the invention is based on an essentially automatic concept which does not rely on the judgement of the operator, the acceptance or rejection criteria being constituted by predetermined parameters introduced as data into the electronic circuits of the measuring system, the results of the tests and measurements optionally being automatically recorded to derive a statistic or other subsequent treatment therefrom. A modified embodiment comprises a graphic recorder for the variation in pressure and adders to account for the result of the tests. To this end, the pressure and time parameters are present electrically according to the type of pack to be monitored.

When applied to production control, the process according to the invention may be used both for sampling and for the systematic examination of all the packs. The object of the process is thus to identify the various hazards of production, such as major leaks, microleaks, the possible absence of product in the pack and even the absence of the packs itself during a measurement.

The absence of a pack, major leaks in the pack and any faults in the tightness of the measuring chamber are detected by means of the differential pressure cell. In the case of flexible packs, leaks are monitored in a measuring chamber adapted in its shape to the pack in order to limit the deformation thereof. The process comprises enclosing the object to be tested in a tight chamber equipped with a detachable cover in which the pressure is initially adjusted to a predetermined value, subsequently measuring the development of this pressure by comparing it automatically with pre-established reference values, the initial value of this pressure being higher or lower than that prevailing in the pack in its free state, the reference values being experimentally determined according ot criteria, specific to each type and size of pack, quantifying the various possible states thereof. The measuring time is normally between 2 and 20 seconds, depending on the pack to be tested. The pressure is also dependent on the sample to be tested and is generally between 100 and 450 torr where measurement is carried out under reduced pressure. In the case of 100 g bags containing soluble coffee, it is preferred to maintain a reduced pressure below 275 torr because otherwise the bag would crack at the folds.

Where excess pressure is applied, the value of p1 is of the order of 1 bar.

The present invention also relates to an arrangement for carrying out this process, comprising the following components connected in line by conduits:

a means for adjusting the pressure, an electrovalve V1 acting as actuator to requlate the pressure p1, a reservoir of volume X1 independent of that of the measuring chamber, a relative pressure cell pA, an electrovalve V3 for separating the section comprising the reservoir from the section comprising the measuring chamber, an electrovalve V4 at the ends of which a differential pressure is measured by differential pressure cell pB and a measuring chamber designed to receive the pack, said chamber comprising a cover by which it can be opened and closed.

Other features will become apparent from the accompanying drawings. The arrangement according to the invention also comprises an electronic device for the introduction and storage of pressure and time parameters, the sequential control of the electrovalves, the control of the pressure in the reservoir, the display of the measurement results and their presentation for recording and/or for processing by an outside terminal.

The process according to the invention will be better understood after the description of one example of embodiment of the arrangement intended to carry it out without being considered as in any way limitative.

DESCRIPTION OF THE PREFERRED EMBODIMENTS

Figure 1:
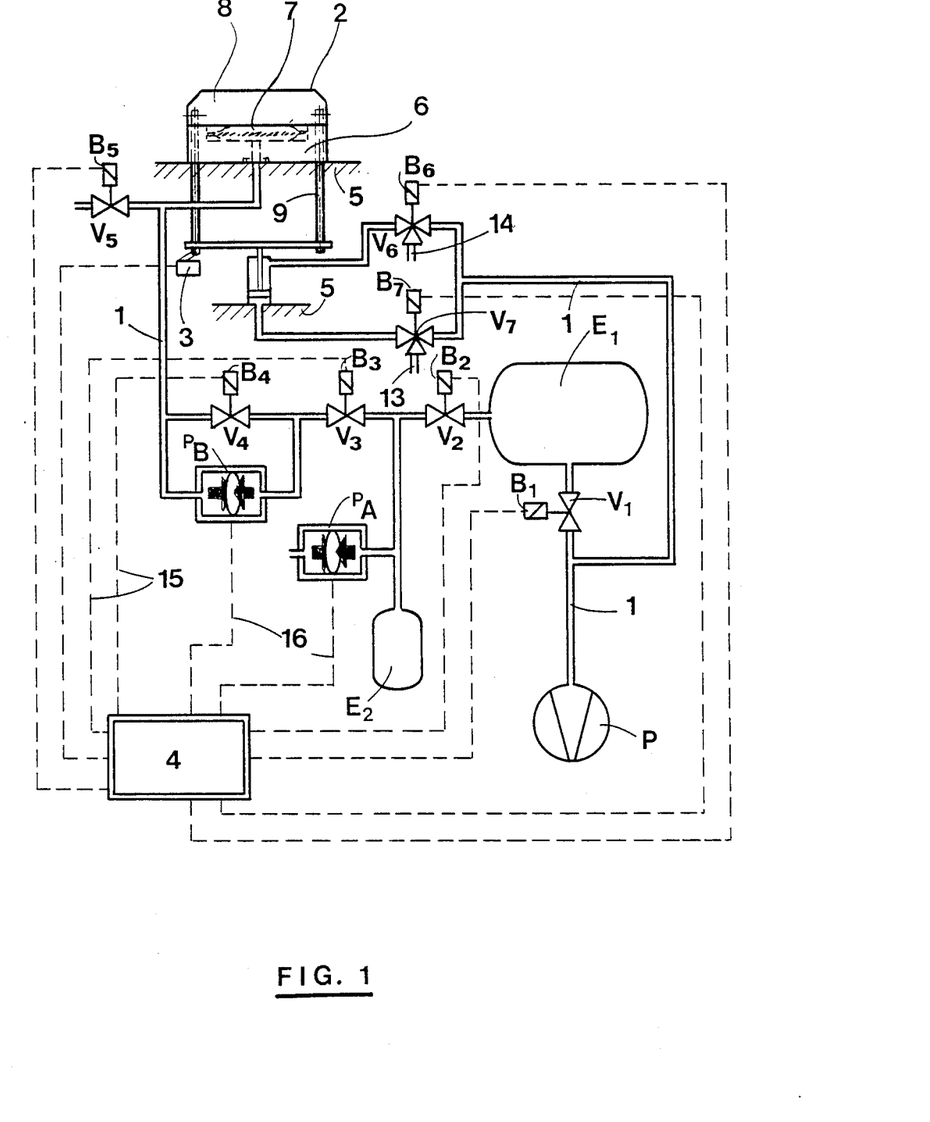
FIG. 1 diagrammatically illustrates the arrangement according to the invention designed to operate under reduced pressure.

As shown in FIG. 1, the arrangement comprises a vacuum pump p fed by the mains (not shown) and connected to the entire system by conduits (1). Between the vacuum pump p and the measuring chamber (2), there is a valve V1 for controlling the level of the vacuum in the arrangement, a reservoir E1 of volume X1 and valves V2, V3, V4 and V5 of which the functions will be explained hereinafter. In addition, connected in parallel relative to the principle circuit between the valves V2 and V3 is a measuring cell PA for measurement and regulation by servo control of the pressure in the arrangement in conjunction with at least the valve V1.

A further, secondary chamber E2 of volume $X2<X1$ is readily connected in parallel. The presence of these two reservoirs E1 and E2 enables packs of very different volume to be measured without any need for particular adaptation of the volumes X1 and X2, the chamber X2 performing hardly any function in the measurement of the leaks themselves.

The differential measuring cell PB connected in parallel with the valve V4 provides for very sensitive measurement of the difference in the pressures upstream and downstream of that valve when it is closed. It is this cell which will be used for measurement of the development of the pressure in the measuring chamber.

The valves V6 and V7 are directly connected to the pump P and, as will be explained hereinafter, enable the measuring chamber (2) to be opened and closed by raising or lowering of the cover (8) in relation to the base (6).

At the level of the measuring chamber (2), the detector (3) serves as an end-of-travel marker during the closure of said chamber to enable the process to continue.

Each of the valves V1 to V7 comprises an induction coil B1 to B7 electrically connected by connections (15) to the electronic control unit (4) which comprises the sequential program for the opening and closing of the electrovalves.

The electrovalves may be of any standard commercial type and will not be described in any more detail here.

The pressure measuring cells PA and PB are also electrically connected by connections (16) to the electronic control unit (4).

The pressure measuring cells PA and PB may also be of any standard commercial type, whether piezo-electric, inductive, resistive or capacitive, and give a signal proportional to the pressure to be measured. It is merely pointed out that the cell PA should have a range at least equal to the pressure used whereas the differential cell PB may highly sensitive. As shown in FIG. 1, the cell PA may readily be of the differential type, one of its inputs being in the open, thus giving a measurement of the relative pressure in the system, which is negative in the present case or positive where the system operates under excess pressure, and connected to a device which generates gas or air under pressure instead of the vacuum pump P.

It can be seen that the arrangement of the pneumatic circuit from the pump P to the measuring chamber (2) is substantially linear, only the auxiliary circuit for controlling the closure piston being connected in parallel.

In one preferred embodiment, the electronic control unit (4) comprises a small, programmable automatic logic device optionally comprising a microprocessor, of which numerous types are commercially available, an analog section for amplifying the signals coming from the sensors and for displaying the measurements they represent in analog form, an analog-digital converter for digital display and a group of circuits making the comparison with reference values previously displayed and memorized by means for potentiometers or through a keyboard or even digital switches.

Since circuits of the type in question are familiar to the man skilled in the art, it is not intended to describe them in any more detail here, nor have they been shown, unless to specify that the measured values and the result of the comparisons described hereinafter are also available in electrical form to serve as input values for a recorder and to actuate the adders or any other means for recording the results outside the arrangement according to the invention.

Figure 2:
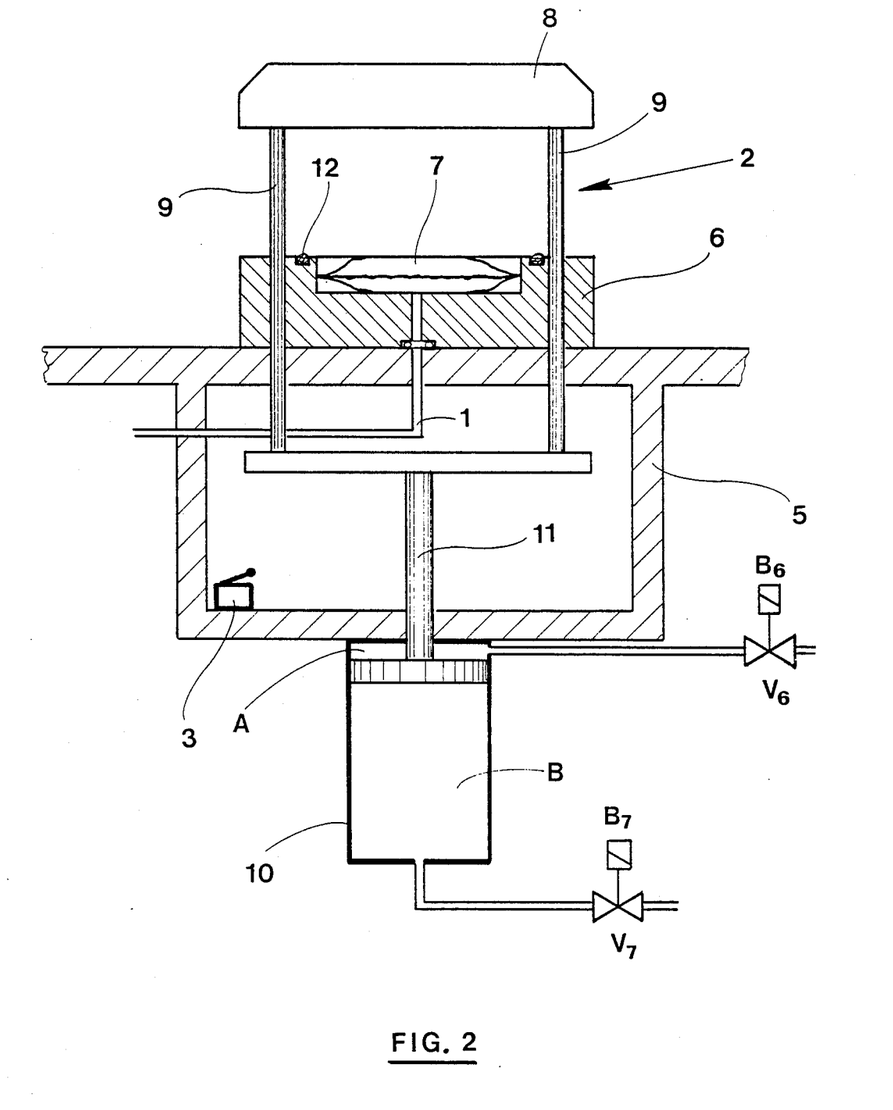
FIG. 2 is a more detailed illustration of the measuring chamber shown in FIG. 1.

As shown in FIG. 2, the measuring chamber (2) comprises a fixed element (6) which is mounted on a frame (5) and which is designed to receive the samples (7) to be tested. The conduit (1) extends to the measuring chamber (2) which additionally comprises a displaceable element (8) fixed to a cylinder (10) and piston (11) system and comprising guides (9). The measuring chamber is opened and closed, i.e., the displaceable element (8) is displaced, under the effect of vacuum and atomspheric pressure on either face of the piston (11). Finally, the chamber comprises at least one seal (12). The measuring chamber may also be opened and closed by means of a cover (8) which is not displaceable, but instead is designed to pivot or tilt about an axis. The speed of movement of the cover may be limited by the addition of throttles between V6, V7 and the piston or at the "open air" outlets of said valves.

The operation of the arrangement according to the invention as described hereinafter is not intended to be interpreted in a limitative sense insofar as features both of the process and of the arrangement according to the invention are mentioned.

A vacuum is established by means of the pump P up to the initially closed valve V3, the valves V1, V2 and V4 being opened and the valve V5 closed. The reduced pressure obtained, which is measured by the cell PA, is displaced on the electronic control unit and compared with a preset value p1. When this value is reached, the valve V1 is closed and remains closed unless it is desired to change the value of p1 between the various phases of the test and measuring process.

In addition, the reduced pressure supplied by the vacuum pump is used to open or close the measuring chamber as and when necessary through the three-way valves V6 and V7 shown in FIG. 1.

To ensure that the measuring chamber is open before any measurement, the valve V6 is opened to establish a vacuum in the section A (FIG. 2) while the valve V7 is closed so that atmospheric pressure prevails in the section B (FIG. 2), the displaceable section (8) thus moving into its upper position while the section B is at atmospheric pressure via the channel 13 of the valve V7. The sample (7) is then placed in the measuring chamber. The valve V7 is opened to establish the vacuum in the section B while the valve V6 is closed to return the section A to atmospheric pressure via the channel 14.

The electrovalves V1, V6 and V7 remain in the above-mentioned states for the rest of the test. The piston (11) moves downwards to the end-of-stroke detector (3). The sample (7) is now ready to undergo the tightness test.

Before the tightness test, the measuring chamber is checked as follows for any leaks, for the presence of the sample and for any major perforation thereof: if the sample is small in size, the valve V3 is opened and the valve V2 is closed so that only the chamber E2 is in use. If the sample is relatively large in size, the valves V2 and V3 are opened so that both the chambers E1 and E2 are in use. A pressure $p2>p1$ is established throughout the system. The value $\Delta p = p2 - p1$ is compared as described hereinafter with three threshold values p3, p4 and p5 to determine on the one hand whether the sample is absent or seriously perforated and, on the other hand, whether the measuring chamber is untight. The arrangements intended solely for measuring packs of relatively large dimensions do not require the use of the reservoir E2. The reservoir may thus be omitted, the same also applying to the electrovalve V2.

Because this preliminary check is rapidly completed, the actual tightness test may be carried out by closing the electrovalve V4, thus isolating the measuring chamber from the rest of the pneumatic circuit.

The cell PB then measures the difference in pressure $\delta p$ between the measuring chamber and the section comprising the reservoir of which the pressure p2 serves as reference.

This pressure difference, which is zero at the moment of closure of the electrovalve V4, will or will not remain zero depending on whether or not the sample is tight. The value of $\delta p$ can be seen on the display part of the electronic control unit (4) and may be recorded on a standard graphic recorder.

As described above, the electronic control unit then compares the valve of $\delta p$ with a pre-established limit value characterizing the acceptable degree of tightness.

On completion of the measurement, the valve V5 is opened to break the vacuum in the measuring chamber.

To open the measuring chamber, V6 is opened to establish a vacuum in A while the valve V7 is closed to return B to atmospheric pressure via the channel 13. The piston (11) moves upwards. The arrangement is now ready for another measurement.

The two main measuring phases of the process are described in more detail hereinafter for operation under reduced pressure.

The principal phase of these two main measuring phases comprises measurement of the actual microleaks, the other being concerned with verification of the presence of a pack and of the absence of major leaks.

The pressure in the reservoirs E1 and E2 having been adjusted as described to a certain predetermined value p1 experimentally selected for a given type of pack and the measuring chamber having been closed, likewise the valve V5, the electrovalves V3 and V4 are opened.

A new pressure value p2 is established in the system as a function of the transfer of gas between the measuring chamber and that part of the circuit comprising the reservoirs E1 and E2.

All other things being equal, the difference $\Delta p = p2 - p1$ will be approximately proportional to the volume of air contained in the chamber and hence to the difference between the volume of the chamber and the initial volume of the pack. Accordingly, it is obvious that the absence of a pack will produce a difference $\Delta p$ greater than that obtained with a tight pack of which the volume is not freely expandable. It is thus possible electrically to compare the difference $\Delta p$ between the succesive values p1 and p2 of the pressure with a reference threshold p3 pre-established by calculation or by experiment for a given pack.

The same applies in the event of a major fault in the tightness of the pack, although in that case the difference $\Delta p$ is smaller because part of the volume is occupied by the packed product. It is thus possible to compare the difference $\Delta p$ with a reference threshold p4, the criterion for a seriously perforated pack, of which the value is also experimentally determined by intentionally placing a perforated pack in the chamber. The value thus determined is readily corrected by a small safety margin before being introduced as parameter into the electronic control unit (4) in order to take into account small differences in the dimensions or in the filling of the packs. Finally, a leak between the cover (8) and the base (6) at the seal (12) will produce an even greater pressure difference. When the system returns to amospheric pressure, a threshold p5 is exceeded.

Figure 3:
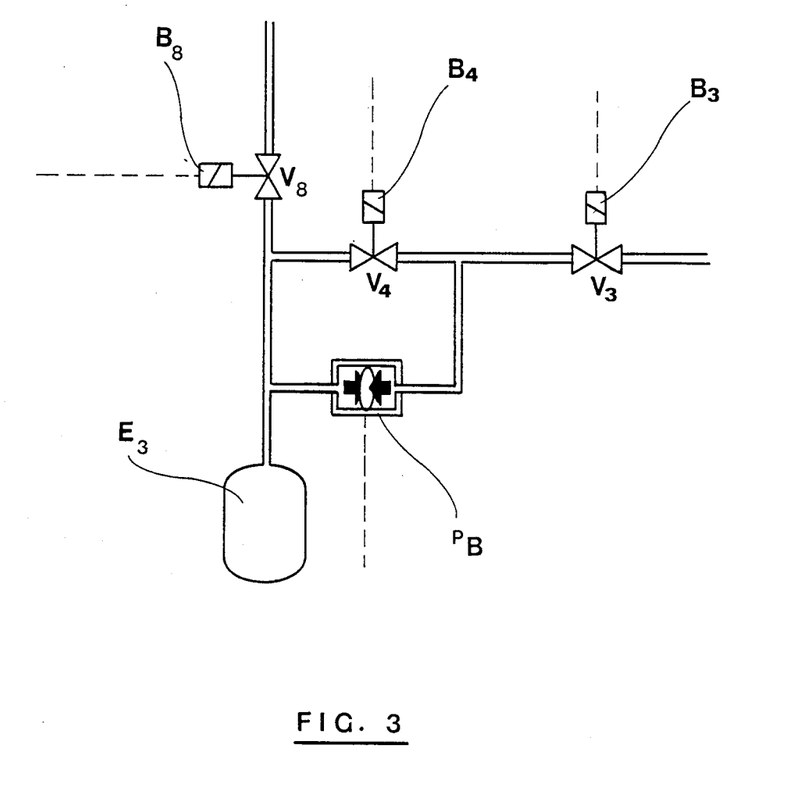
FIG. 3 shows part of the arrangement of FIG. 1 with a measuring variant for $\Delta p$.

Since calculation of the difference between the pressures p1 and p2 is not necessarily easy in the case of small differences, FIG. 3 shows by way of Example a preferred embodiment which enables $\Delta p$ to be directly measured by means of the differential measuring cell PB, utilizing the high sensitivity thereof.

Compared with the arrangement shown in FIG. 1, this preferred embodiment additionally comprises a valve V8 together with its induction coil B8 and a chamber E3 of small volume X3. Initially, the valves V3, V4 and V8 are closed. V4 is opened, followed by V3. The chamber E3 is thus at the pressure p1. V4 is closed, after which V8 is opened, the pressure p2 being established in the chamber E3 and at one of the inputs of the cell PB, the other input remaining at the pressure p1. It is thus possible directly to display $\Delta p$ on the electronic control unit (4) and to compare its value with the threshold values introduced beforehand, for example, by display on the potentiometers.

Alternatively, the above test may be carried out without V3 or V8 by reclosing V2 and opening V3 and V4. The reservoir E2 and the measuring chamber (7) and thus at a pressure p2. V4 is then closed and V2 opened. The cell PB measures a pressure difference $\Delta p' = p2 - p1'$, $p1'$ being a value similar to p1 where $X2 < < X1$.

Then, if the pressure p2 or $p1'$ is sufficiently close to p1, in other words if the dead volume in the measuring chamber containing the pack is sufficiently small, the detection of leaks and their display are carried out at the pressure p2 in the system.

By contrast, if p1 is very different from p2, it may be preferable to restore the pressure throughout the system to its initial value p1 before the pack in question is measured for leaks.

The measurement of a pack for leaks is then carried out by isolating the part containing the chamber from the part comprising the reservoirs after the electrovalve V4 has been opened for a brief instant and then closed again.

These are now two possibilities: if the pack is tight, the pressures will remain stable throughout the system, the value $\delta p$ measured by the cell PB is zero and remains zero.

If, by contrast, the pack is perforated, the pressure in the measuring cell is increased by the escape of air from the pack. This results in a variation $d\delta p/dt$ and hence, after a certain time, in a pressure difference $\delta p$ at the inputs of the cell PB.

The electrical analog signal corresponding to the value of $\delta p$ and hence proportional to the leak may thus be recorded in a graphic form and simultaneously displayed on an instrument and even compared with a threshold value, the analog display being readily implemented on an instrument comprising a scale of 200%, the value 100% corresponding to the acceptability threshold or limit of tightness.

The criterion of acceptance of the pack, which corresponds to the maximum value of the admissible microleak, may be electronically fixed in the form of a comparison threshold for $\delta p$ of usually from 0 to 50 torr relating to the variation in pressure over a predetermined period, for example of 2 to 60 seconds, for a fixed value of p1. These parameters then remain valid for the type of pack in question.

It is obvious that the electronic circuit could also use the criterion $d\delta p/dt$ by differentiation, although this would be less easy.

In addition, it should be pointed out that the test and measuring operations have to take place relatively quickly not only for reasons of productivity, but also because the quantity of air or gas contained in the pack is limited. The measurement of $\delta p$ should also be effected while a sufficient pressure difference prevails between the interior of the pack and the measuring chamber. For the same reasons, the measuring chamber should comprise as small a dead volume as possible to ensure maximal sensitivity of measurement. Accordingly, it should be adapted to the shape of the samples to be measured either during its production where it is designed for a single type a pack or by adaptation of additional filling elements where it is designed to accommodate samples of different shape.

The foregoing explanation also shows that the volume of the reservoirs E1 and E2 has no bearing on the measurement of $\delta p$. The only requirement for this measuring phase is that the pressure in the reservoirs should remain stable because it acts as a reference to the cell pB.

Practical experience confirms the obvious reasoning that it is sufficient for the reservoir E1 to be large enough to allow an adequate reduced pressure in the measuring chamber, for example 500 torr, without any loss of pumping time through V1.

Since the pack initially contains a certain volume of gas under a certain pressure, its confinement in a tight chamber subjected after closure to a pressure different from atmospheric pressure will produce an elastic deformation if the material is flexible or semirdigid or an expansion or compression, depending on whether the pressure applied to the measuring chamber is above or below atmospheric pressure. Except in the case of an infinitely deformable bag, a pressure difference will nevethless be created between the pack and the dead volume of the chamber, persisting or developing according to the degree of tightness.

In the case of a particularly flexible pack, such as a flat bag, its surface will ultimately come into contact with the upper and lower faces of the chamber of which the dimensions—as was seen earlier—have to be kept as small as possible to limit the dead volume.

This particular case is shown in FIG. 2, the upper face of the chamber merely being the flat face of the cover.

Study of the sequence of measurement of the leaks shows that the preliminary check is essential because a seriously perforated pack or the absence of a pack does not produce any variation δP.

The complete test is normally over in a few seconds.

The phases of measurement of the microleaks and of checking for the presence of samples, their non-perforation and the tight closure of the chamber may be reversed.

In order to save time, the checking phase may even be omitted if leakage measurement gives a result which falls within certain predetermined limit values.

For example, the checking phase need only carried out if the measured leak is zero or substantially zero which may indicate that the sample is seriously perforated or absent or even when the leak is very considerable which may indicate that a cell has not been properly closed or that a seal is not tight.

All that has been said in the foregoing for an arrangement operating under reduced pressure is also applicable where the arrangement operates under excess pressure, i.e., with a compressor, a compressed gas cylinder or any other suitable means.

We claim:

1. A process for detecting leaks in sealed packages in a leak detection system comprising:
    establishing a predetermined pressure in a first system section which includes two first system section pressure reservoirs of differing volumes connected in parallel to a first conduit in common with each reservoir and which includes a first system section pressure measuring cell for measuring a pressure of the first system section;
    isolating the pressure of the smaller reservoir from the pressure of the larger reservoir;
    placing the pressure of the smaller reservoir in communication, via the first conduit, with a second system section, which includes a sealed measuring chamber for containing a sealed package to be detected for leaks, for establishing a pressure for a combination of the smaller reservoir and measuring chamber;
    isolating the pressure of the measuring chamber from the pressure of the smaller reservoir and then placing the pressure of the smaller reservoir in communication with the pressure of the larger reservoir for establishing a pressure in a combination of the smaller and larger reservoirs;
    measuring for a time sufficient, by means of a differential pressure cell positioned in a second conduit which is connected in parallel to the first conduit and being in communication with the measuring chamber and with the combination of the smaller and larger reservoirs, pressure in the measuring chamber relative to the pressure of the combination of reservoirs for detecting changes in pressure in the measuring chamber; and
    relating, via a control unit, changes in pressure measured by the differential pressure cell with a reference pressure and predetermined values for detecting leaks in a sealed package in the measuring chamber.

2. A process according to claim 1 further comprising, after measuring, establishing the first established predetermined pressure of the first system section in the combination of reservoirs and measuring chamber and then isolating the measuring chamber from the combination of reservoirs and again measuring changes is pressure with the differential pressure cell and relating the measurements via the control unit for detecting leaks.

3. A process for detecting leaks in sealed packages in a leak detection system comprising:
    establishing a predetermined pressure in a first system section, which includes two first system section pressure reservoirs of differing volumes connected in parallel to a first conduit in common with each reservoir and which includes a first system section pressure measuring cell for measuring a pressure of the first system section, and in a third reservoir in communication wit the first conduit and the smaller of the reservoirs of the first system section;
    isolating the pressure of the third reservoir from the pressure of the first system section reservoirs;
    placing the pressure of the isolated third reservoir in communication with a second system section, which includes a sealed measuring chamber for containing a sealed package to be detected for leaks and which is connected to the first conduit, for establishing a pressure for a combination of the third reservoir and measuring chamber;
    measuring for a time sufficient, by means of a differential pressure cell positioned in a second conduit which is connected in parallel with the first conduit and being in communication with the combination of the third reservoir and measuring chamber and with the first system section reservoirs, pressure in the combination of the third reservoir and measuring chamber relative to the pressure of the first system section reservoirs for detecting changes in pressure in the combination of the third reservoir and chamber; and
    relating, via a control unit, changes in pressure measured by the differential pressure cell with a reference pressure and predetermined values for detecting leaks in a sealed package in the measuring chamber.

4. A process according to claim 3 further comprising, after measuring, establishing the first established predetermined pressure of the first system section in the combination of reservoirs of the first system section and the combination of the third reservoir and measuring chamber and then isolating the combination of the measuring chamber and third reservoir from the first system section reservoirs and again measuring changes in pressure with the differential pressure cell and relating the measurements via the control unit for detecting leaks.

5. An apparatus for detecting leaks in sealed packages comprising:
   a first system section which includes two first system section pressure reservoirs of differing volumes connected in parallel to a first conduit in common with each reservoir and which includes a first system section pressure measuring cell for measuring a pressure of the first system section;
   a second system section which includes a measuring chamber having a removable cover, the measuring chamber being connected to the first system section by the first conduit;
   means connected with the first system section for adjusting pressure;
   a differential pressure cell positioned in a second conduit which is connected in parallel to the first conduit between the measuring chamber and the first system section reservoirs;
   a first electrovalve positioned in the first conduit between the connections of the second conduit and the first conduit for isolating pressure between the measuring chamber and first system section reservoirs for enabling measuring of differences of pressure between the measuring chamber and the first system section reservoirs by means of the differential pressure cell in the second conduit;
   a second electrovalve positioned in the first conduit between the first system section of the reservoirs and the connection of the second conduit nearest the reservoirs for isolating pressure between the first system section of the reservoirs and a combination of the measuring chamber and differential pressure cell; and
   a third electrovalve positioned in the first conduit between the two reservoirs for isolating pressure between the reservoirs.

6. An apparatus according to claim 5 further comprising:
   a third reservoir positioned between the measuring chamber, and the first electrovalve and differential pressure cell connected by a further conduit to the first and second conduits; and
   an electrovalve posistioned in the first conduit between the third reservoir and the measuring chamber for isolating pressure between the third reservoir and the chamber.

7. An apparatus according to claim 5 further comprising an electronic control device for receiving signals from the measuring cells, for controlling the electrovalves, for controlling the means for adjusting pressure and for enabling detection of leaks in a sealed package.

8. An apparatus according to claim 6 further comprising an electronic control device for receiving signals from the measuring cells, for controlling the eletrovalves, for controlling the means for adjusting pressure and for enabling detection of leaks in a sealed package.

* * * * *

UNITED STATES PATENT AND TRADEMARK OFFICE
CERTIFICATE OF CORRECTION

PATENT NO. : 4,858,463
DATED : August 22, 1989
INVENTOR(S) : Meinrad ROSSE, et al.

It is certified that error appears in the above-identified patent and that said Letters Patent is hereby corrected as shown below:

Column 10, line 28 (line 6 of claim 2), "is" should read --in--.

Column 10, line 40 (line 10 of claim 3), "wit" should read --with--.

Column 12, line 16 (line 4 of claim 6), delete the comma after "chamber".

Signed and Sealed this

Twelfth Day of June, 1990

Attest:

HARRY F. MANBECK, JR.

*Attesting Officer*  *Commissioner of Patents and Trademarks*